US012579431B2

(12) United States Patent

Ravindranath et al.

(10) Patent No.: US 12,579,431 B2

(45) Date of Patent: Mar. 17, 2026

(54) METHOD AND SYSTEM FOR MACHINE LEARNING BASED UNDERSTANDING OF DATA ELEMENTS IN MAINFRAME PROGRAM CODE

(71) Applicant: Tata Consultancy Services Limited, Mumbai (IN)

(72) Inventors: Yogananda Ravindranath, Chennai (IN); Tamildurai Mehalingam, Chennai (IN); Reshinth Gnana Adithyan, Chennai (IN); Shrayan Banerjee, Chennai (IN); Balakrishnan Venkatanarayanan, Chennai (IN); Aditya Thuruvas Senthil, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 981 days.

(21) Appl. No.: 17/741,612

(22) Filed: May 11, 2022

(65) Prior Publication Data

US 2022/0405584 A1 Dec. 22, 2022

(30) Foreign Application Priority Data

May 13, 2021 (IN) .............................. 202121021729

(51) Int. Cl.
*G06N 3/08* (2023.01)
*G06F 16/901* (2019.01)

(52) U.S. Cl.
CPC ........... *G06N 3/08* (2013.01); *G06F 16/9024* (2019.01)

(58) Field of Classification Search
CPC .......... G06N 3/042; G06N 3/047; G06N 3/08; G06N 3/09
See application file for complete search history.

(56) References Cited

U.S. PATENT DOCUMENTS 10,162,610 B2 12/2018 Apte et al.

OTHER PUBLICATIONS

Cummins et al., "ProGraML: Graph-Based Deep Learning for Program Optimization and Analysis," (2020).
(Continued)

*Primary Examiner* — Grace Park
(74) *Attorney, Agent, or Firm* — Finnegan, Henderson, Farabow, Garrett & Dunner, LLP

(57) ABSTRACT

Most of the existing production applications in different domains are still running on. Mainframe applications in production receive data from various resources and process these data within. Understanding the structure of input data and output data is extremely important. A method and system for machine learning based understanding of a plurality of data elements in a mainframe program code has been provided. The method discloses a machine learning model that understands the structure of data elements in a Mainframe program code. The model considered is a graph neural network based architecture model. The disclosed method replicates memory mapping happening in the application program environment. The method understands the structure of the data element and the impact created by each data element on other data elements in the application and interfacing applications. The disclosed solution serves as a building block in problems such as code translation, reverse engineering etc.

11 Claims, 4 Drawing Sheets

(56)          References Cited

OTHER PUBLICATIONS

Dheyab et al., "A novel approach for big data processing using message passing interface based on memory mapping," J Big Data, 6:112 (2019).
Huang, "Graph Auto-Encoders with Edge Reweighting," International Journal of Research in Engineering and Science (IJRES), 9(1) (2021).
Song et al., "DeepMEM: Learning Graph Neural Network Models for Fast and Robust Memory Forensic Analysis," (2018).
Ye et al., "A Vectorized Relational Graph Convolutional Network for Multi-Relational Network Alignment," (2019).

200

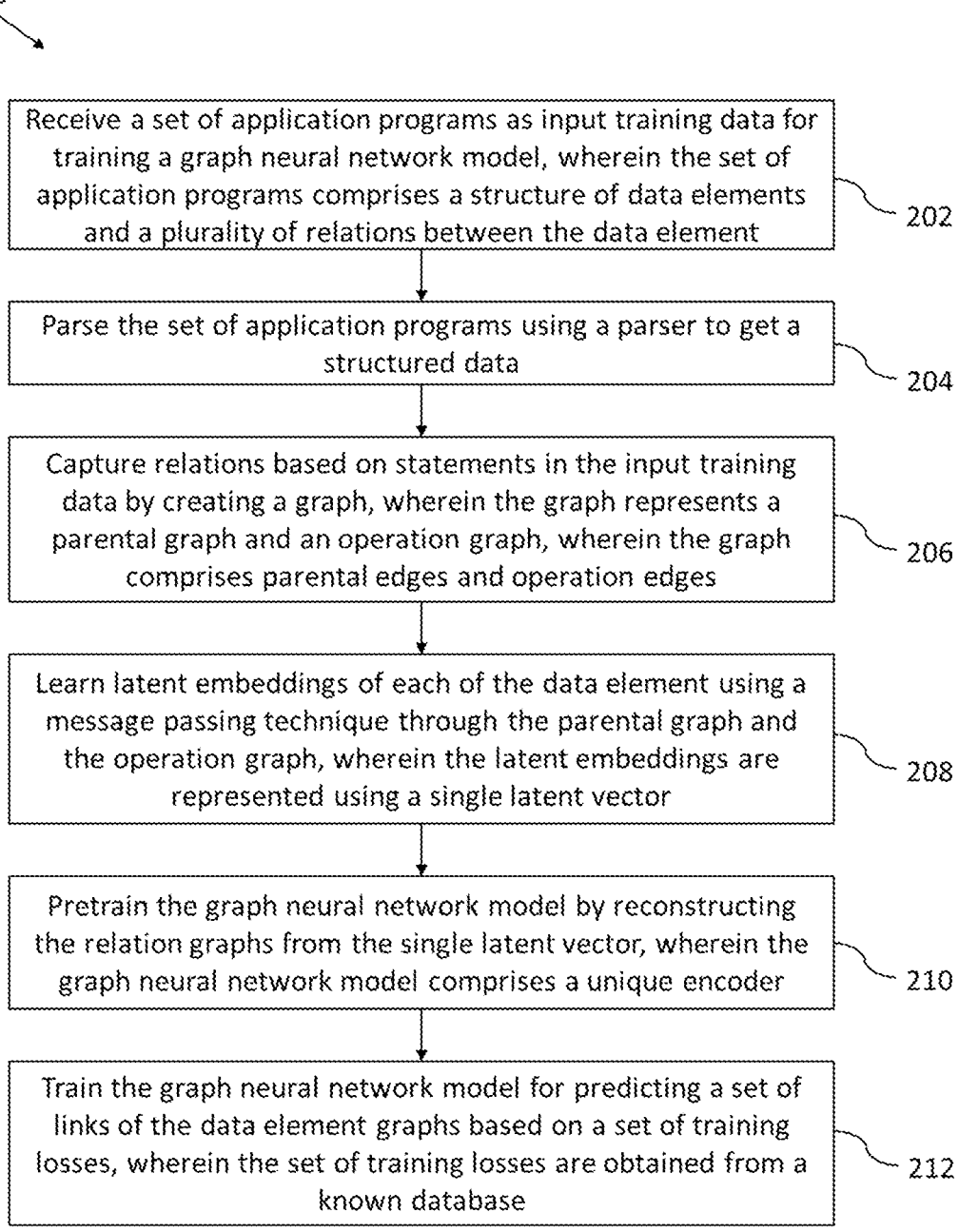

Receive a set of application programs as input training data for training a graph neural network model, wherein the set of application programs comprises a structure of data elements and a plurality of relations between the data element          202

Parse the set of application programs using a parser to get a structured data          204

Capture relations based on statements in the input training data by creating a graph, wherein the graph represents a parental graph and an operation graph, wherein the graph comprises parental edges and operation edges          206

Learn latent embeddings of each of the data element using a message passing technique through the parental graph and the operation graph, wherein the latent embeddings are represented using a single latent vector          208

Pretrain the graph neural network model by reconstructing the relation graphs from the single latent vector, wherein the graph neural network model comprises a unique encoder          210

Train the graph neural network model for predicting a set of links of the data element graphs based on a set of training losses, wherein the set of training losses are obtained from a known database          212

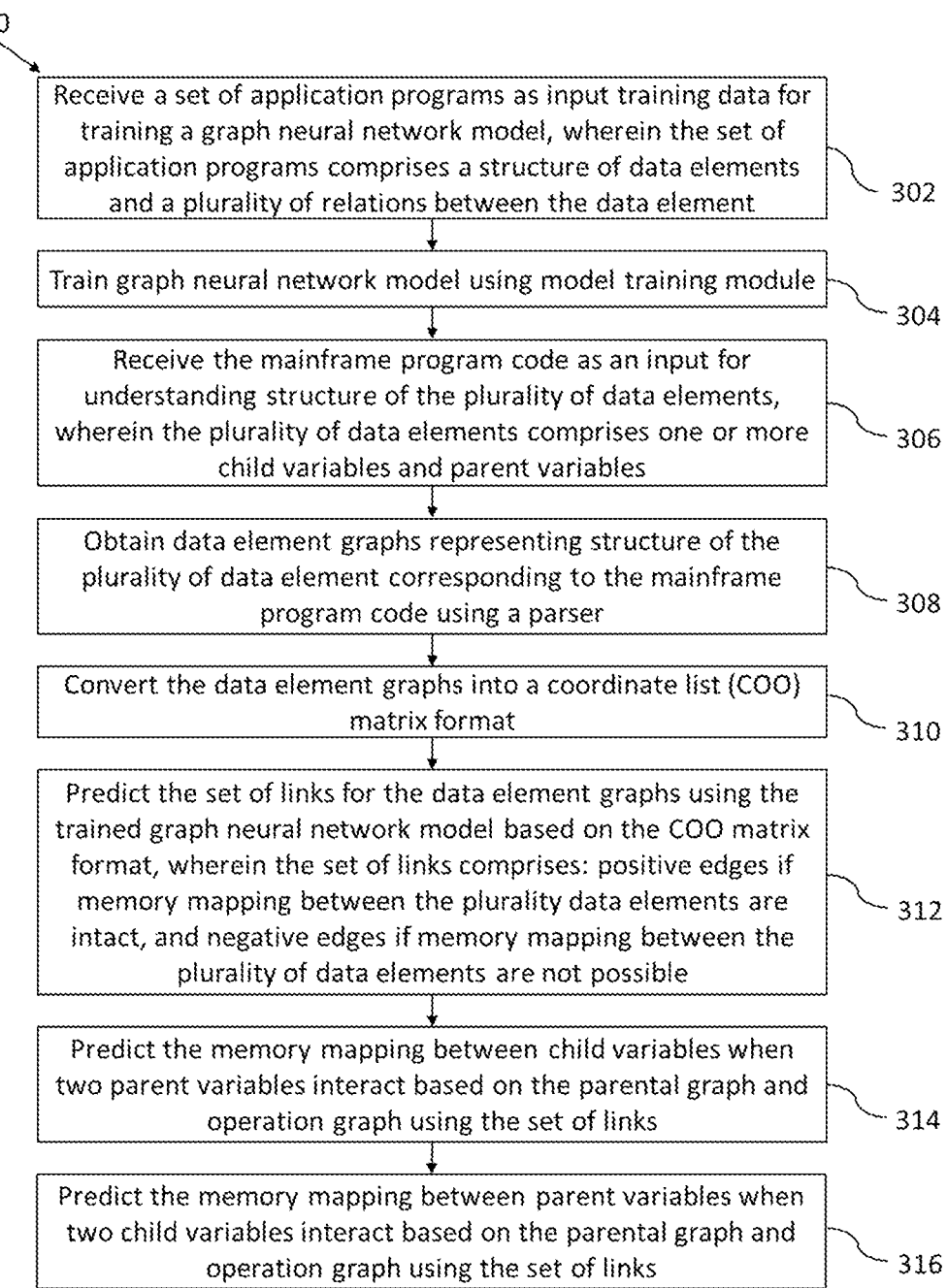

Receive a set of application programs as input training data for training a graph neural network model, wherein the set of application programs comprises a structure of data elements and a plurality of relations between the data element ⟍ 302

Train graph neural network model using model training module ⟍ 304

Receive the mainframe program code as an input for understanding structure of the plurality of data elements, wherein the plurality of data elements comprises one or more child variables and parent variables ⟍ 306

Obtain data element graphs representing structure of the plurality of data element corresponding to the mainframe program code using a parser ⟍ 308

Convert the data element graphs into a coordinate list (COO) matrix format ⟍ 310

Predict the set of links for the data element graphs using the trained graph neural network model based on the COO matrix format, wherein the set of links comprises: positive edges if memory mapping between the plurality data elements are intact, and negative edges if memory mapping between the plurality of data elements are not possible ⟍ 312

Predict the memory mapping between child variables when two parent variables interact based on the parental graph and operation graph using the set of links ⟍ 314

Predict the memory mapping between parent variables when two child variables interact based on the parental graph and operation graph using the set of links ⟍ 316

FIG. 3

METHOD AND SYSTEM FOR MACHINE LEARNING BASED UNDERSTANDING OF DATA ELEMENTS IN MAINFRAME PROGRAM CODE

PRIORITY CLAIM

This U.S. patent application claims priority under 35 U.S.C. § 119 to: Indian Patent Application No. 202121021729 filed on 13 May 2021. The entire contents of the aforementioned application are incorporated herein by reference.

TECHNICAL FIELD

The disclosure herein generally relates to the field of memory mapping during application transformation in mainframe program, and, more particularly, to a method and system for machine learning based understanding of a plurality of data elements in a mainframe program code.

BACKGROUND

Most of the existing production applications in different domains of banking, insurance, retail, manufacturing etc. are still running on Mainframe and the have evolved over the decades in response to the business, technology and regulatory needs. Mainframe applications in production receive data from various resources and process these data within. Both the input data and the output data flowing into or from the applications follow a structure. Understanding the structure of this input data and output data is extremely important and serves as a building block in all kinds of problems such as code translation, code reverse engineering, code impact analysis and so on. The data elements and its structure in Mainframe makes it even more difficult to understand its memory structure and the impact of its change in the overall application. This gap in the understanding makes enhancements/transformation of the application more difficult.

The structure of the input data and output data can be in the form of data elements such as screen or file or table or other program copybooks. The data movement through these data elements into the applications can be to either small or large local data structures. These data movement may lead to truncation or padding of the information. Also, the structure of these data elements or variables ensure that the values passed on to them are automatically assigned to their child variables also. As the data movement in the child and parent variables are not explicitly available as physical statements in the code, parsing techniques alone cannot be applied to solve the same.

The prior techniques of resolving parent-child impact analysis is a sequential process wherein the depth is solved one after the other from the super-parent variable to the elementary. The process is computationally expensive and becomes further complex when the structure goes deeper.

SUMMARY

Embodiments of the present disclosure present technological improvements as solutions to one or more of the above-mentioned technical problems recognized by the inventors in conventional systems. For example, in one embodiment, a system for machine learning based understanding of a plurality of data elements in a mainframe program code. The system comprises a user interface, one or more hardware processors and a memory. The user interface receives a set of application programs as input training data for training a graph neural network model, wherein the set of application programs comprises a structure of the plurality of data elements and a plurality of relations between the plurality of data elements. The memory is in communication with the one or more hardware processors, wherein the one or more first hardware processors are configured to execute programmed instructions stored in the one or more first memories, to: parse the set of application programs using a parser to get a structured data; capture relations based on statements in the input training data by creating a graph, wherein the graph represents a parental graph and an operation graph, wherein the graph comprises parental edges and operation edges; learn latent embeddings of each of the plurality of data elements using a message passing technique through the parental graph and the operation graph, wherein the latent embeddings are represented using a single latent vector; pretrain the graph neural network model by reconstructing the relation graphs from the single latent vector, wherein the graph neural network model comprises a unique encoder; train the graph neural network model for predicting a set of links of the plurality of data element graphs based on a set of training losses, wherein the set of training losses are obtained from a known database; receive the mainframe program code as an input for understanding structure of the plurality of data elements, wherein the plurality of data elements comprises one or more child variables and parent variables; obtain data element graphs representing structure of the plurality of data elements corresponding to the mainframe program code using a parser; convert the data element graphs into a coordinate list (COO) matrix format; predict the set of links for the data element graphs using the trained graph neural network model based on the COO matrix format, wherein the set of new links comprises: positive edges if memory mappings between the plurality data elements are intact, and negative edges if memory mappings between the plurality of data elements are not possible; predict the memory mapping between child variables when two parent variables interact based on the parental graph and operation graph using the set of links; and predict the memory mapping between parent variables when two child variables interact based on the parental graph and operation graph using the set of links.

In another aspect, a method for machine learning based understanding of a plurality of data elements in a mainframe program code is provided. Initially, a set of application programs is received as input training data for training a graph neural network model, wherein the set of application programs comprises a structure of the plurality of data elements and a plurality of relations between the plurality of data elements. The set of application programs are then parsed using a parser to get a structured data. In the next step, relations based on statements in the input training data is captured by creating a graph, wherein the graph represents a parental graph and an operation graph, wherein the graph comprises parental edges and operation edges. Further latent embeddings of each of the plurality of data elements is learnt using a message passing technique through the parental graph and the operation graph, wherein the latent embeddings are represented using a single latent vector. In the next step, the graph neural network model is pretrained by reconstructing the relation graphs from the single latent vector, wherein the graph neural network model comprises a unique encoder. In the next step, the graph neural network model is trained for predicting a set of links of the data element graphs based on a set of training losses, wherein the set of training losses are obtained from a known database.

Further, the mainframe program code is received as an input for understanding structure of the plurality of data elements, wherein the plurality of data elements comprises one or more child variables and parent variables. The data element graphs representing structure of the plurality of data elements are then obtained corresponding to the mainframe program code using a parser. The data element graphs are then converted into a coordinate list (COO) matrix format. In the next step, the set of links is predicted for the data element graphs using the trained graph neural network model based on the COO matrix format, wherein the set of links comprises: positive edges if memory mappings between the plurality data elements are intact, and negative edges if memory mappings between the plurality of data elements are not possible. Further the memory mapping between child variables is predicted when two parent variables interact based on the parental graph and operation graph using the set of links. And finally, the memory mapping between parent variables is predicted when two child variables interact based on the parental graph and operation graph using the set of links.

In yet another aspect, there are provided one or more non-transitory machine-readable information storage mediums comprising one or more instructions which when executed by one or more hardware processors cause machine learning based understanding of a plurality of data elements in a mainframe program code. Initially, a set of application programs is received as input training data for training a graph neural network model, wherein the set of application programs comprises a structure of the plurality of data elements and a plurality of relations between the plurality of data elements. The set of application programs are then parsed using a parser to get a structured data. In the next step, relations based on statements in the input training data is captured by creating a graph, wherein the graph represents a parental graph and an operation graph, wherein the graph comprises parental edges and operation edges. Further latent embeddings of each of the plurality of data elements is learnt using a message passing technique through the parental graph and the operation graph, wherein the latent embeddings are represented using a single latent vector. In the next step, the graph neural network model is pretrained by reconstructing the relation graphs from the single latent vector, wherein the graph neural network model comprises a unique encoder. In the next step, the graph neural network model is trained for predicting a set of links of the data element graphs based on a set of training losses, wherein the set of training losses are obtained from a known database. Further, the mainframe program code is received as an input for understanding structure of the plurality of data elements, wherein the plurality of data elements comprises one or more child variables and parent variables. The data element graphs representing structure of the plurality of data elements are then obtained corresponding to the mainframe program code using a parser. The data element graphs are then converted into a coordinate list (COO) matrix format. In the next step, the set of links is predicted for the data element graphs using the trained graph neural network model based on the COO matrix format, wherein the set of links comprises: positive edges if memory mappings between the plurality data elements are intact, and negative edges if memory mappings between the plurality of data elements are not possible. Further the memory mapping between child variables is predicted when two parent variables interact based on the parental graph and operation graph using the set of links. And finally, the memory mapping between parent variables is predicted when two child variables interact based on the parental graph and operation graph using the set of links.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flowchart showing steps involved in training a graph neural network model according to some embodiments of the present disclosure.

FIG. 3 is a flow chart of a method for machine learning based understanding of a plurality of data elements in a mainframe program code accordance with some embodiments of the present disclosure.

DETAILED DESCRIPTION

Figure 1:
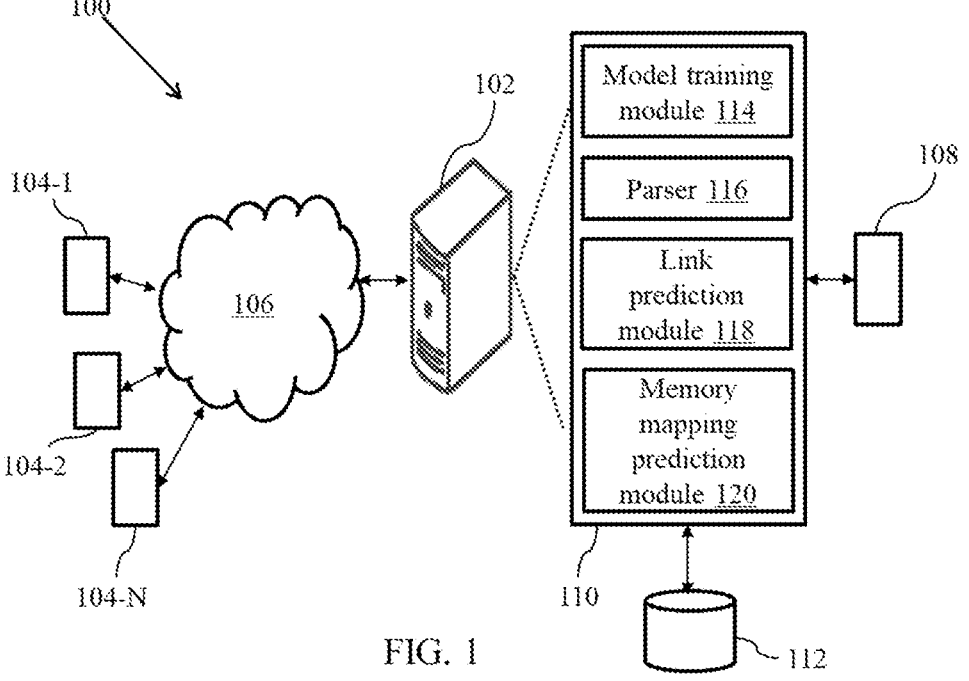
FIG. 1 illustrates a block diagram of a system for machine learning based understanding of a plurality of data elements in a mainframe program code according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Most of the existing production applications in different domains of banking, insurance, retail, manufacturing etc. are still running on Mainframe and have evolved over the decades in response to the business, technology and regulatory needs. Mainframe applications in production receive data from various resources and process these data within. Both the input data and the output data flowing into or from the applications follows a structure. Understanding the structure of this input data and output data is extremely important and serves as a building block in all kinds of problems. The data elements and its structure in Mainframe makes it even more difficult to understand its memory structure and the impact of its change in the overall application. This gap in the understanding makes enhancements/transformation of the application more difficult.

The present disclosure provides a method and system for machine learning based understanding of a plurality of data elements in a mainframe program code. The method discloses a machine learning model that understands the structure of data elements in a Mainframe program code. The machine learning model considered is a graph neural network based architecture model. The application program considered for understanding the data element structure may be a mainframe program, a natural program, an AS400 program and so on. The disclosed method replicates memory mapping happening in the application program environment. The method understands the structure of the data element and the impact created by each data element on other data elements in the application and interfacing applications. The solution of the disclosed method serves as a building block in problems such as code translation, code reverse engineering, code impact analysis and so on.

In an embodiment, the graph neural network based architecture model may alternatively be referred as a model.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates a network diagram of a system 100 for machine learning based understanding of a plurality of data elements in a mainframe program code. The present disclosure provides machine learning (ML) based memory map learning approach that mimics the memory mapping as in the Mainframe compiler itself and understands the structure and the impact created by each data element on other data elements in the application and interfacing applications. The solution involves learning latent embedding of nodes (Variables) in the program by using distinct message passing in two different graphs: a) Operation based message passing, and b) Hierarchy based message passing. In the proposed solution approach, the structure of the input variable is learnt by the system and a prediction of the data movement that happens between the children (due to a parent)/between the parents (due to child movement) etc. is learnt by the system.

Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of modules. The plurality of modules is configured to perform various functions. The plurality of modules comprises a model training module 114, a parser 116, a link prediction module 118 and a memory mapping prediction module 120.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, a block diagram of the system 100 for machine learning based understanding of a plurality of data elements in the mainframe program code is shown in FIG. 1. According to an embodiment of the disclosure, the system 100 comprises the model training module 114. The module training module 114 is configured to train a graph neural network based architecture model for data element structure understanding. A flowchart 200 illustrating steps involved in training the graph neural network model is shown in FIG. 2. At step 202 of the method 200, the system 100 is configured to receive a set of application programs as input training data for training the graph neural network model, wherein the set of application programs comprises a structure of the plurality of data elements and a plurality of relations between the plurality of data element.

At step 204 of the method 200, the system 100 is configured to parse the set of application programs using a parser to get a structured data. The data element graphs representing data element structures are obtained corresponding to each of the application programs among the set of application programs. A native parser may be used for parsing an unstructured code text into a structured data. Size, properties and other information of data element structures are captured to create node of data element graphs.

At step 206 of the method 200, the system 100 is configured to capture relations based on statements in the input training data by creating a graph, wherein the graph represents a parental graph and an operation graph, wherein the graph comprises parental edges and operation edges. The parental graph provides a mapping of parent-child relation of data element structure and the operation graph provides the kind of relation between the parent and child data element structure such as MOV, COMP and so on.

At step 208 of the method 200, the system 100 is configured to learn latent embeddings of each of the data element using a message passing technique through the parental graph and the operation graph, wherein the latent embeddings are represented using a single latent vector.

At step 210 of the method 200, the system 100 is configured to pretrain the graph neural network model by reconstructing the relation graphs from the single latent vector, wherein the graph neural network model comprises a unique encoder. The reconstruction of relation graphs comprises encoding the relation graph and further reconstructing from a single latent vector provided by the unique encoder. The unique encoder learns an optimal order of stacking of relational messages. The learning starts with random stacking of relational messages. After a few steps of learning, the probability of the order of stacking used becomes aligned with respect to the pretraining. Thus, at the end of the learning, the optimal order of stacking is obtained. The graph neural network model is pre-trained using the coordinate list (COO) matrix format of the data element graphs. The pre-training task of the model involves reconstructing relation graphs from a single latent vector, accompanied by the unique encoder. Typically graph neural network models based message passing models are permutation invariant. The unique encoder designed for the model breaks the permutation invariant nature. The unique encoder starts stacking up different relational messages passed, in order to learn an optimal order of stacking of relational messages. This improves the composability in the latent vector, which increases the complexity for a decoder to decode and also provides flexibility for the model to prioritize specific types of relation over the complete set of relations. This trained unique encoder is further used for any downstream task.

At step 212 of the method 200, the system 100 is configured to train the graph neural network model for predicting a set of links of the data element graphs based on a set of training losses, wherein the set of training losses are obtained from a known database. The training task is modelled with two different training strategies, both of which happens during each batch. The weights in the graph neural network based architecture model during training are updated based on two distinct training tasks.

In an embodiment, the first training task is unsupervised variational-auto-encoder training using an unsupervised auto-encoder loss. The unsupervised auto-encoder loss tries to reconstruct both the data element graphs from the same latent embedding. Both the graphs of the data element graphs based message passing are alternatively updated into one latent embedding. The auto-encoder loss is reconstructed from each of node embedding.

In another embodiment, the second training task is for a supervised link prediction task. This training is based on a link prediction task wherein a new edge with the possibility of memory mapping is predicted. The prediction of link is based on a binary classification. If the memory mapping between two data elements are intact, then the binary classification is true which results into positive edges. If the memory mapping between two data elements are not possible, then the binary classification is false which results into negative edges. The model is trained with a collection of losses such as loss from reconstruction of operation graph, loss from reconstruction of parental graph and cross entropy loss. Thus, a prediction of the data movement that happens between the children (due to parent movement) or between the parents (due to child movement) is learnt by the model. The steps from 202 to 210 depicts the process steps for training the graph neural network based architecture model for data element structure understanding in application program.

FIG. 3 illustrates an example flow chart of a method 300 for machine learning based understanding of the plurality of data elements in the mainframe program code, in accordance with an example embodiment of the present disclosure. The method 300 depicted in the flow chart may be executed by a system, for example, the system 100 of FIG. 1. In an example embodiment, the system 100 may be embodied in a computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

Initially, at step 302 of the method 300, the set of application programs is received as input training data for training the graph neural network model. The set of application programs comprises the structure of the plurality of data elements and the plurality of relations between the plurality of data element. At step 304, the graph neural network model is trained using the model training module 114. The detailed steps involved in the training are explained in flowchart 200.

At step 306 of the method 300, the system 100 is configured to receive the mainframe program code as the input for understanding structure of the plurality of data elements, wherein the plurality of data elements comprises one or more child variables and parent variables.

At step 308 of the method 300, the system 100 is configured to obtain data element graphs representing structure of the plurality of data element corresponding to the mainframe program code using the parser 116. Further at step 310, the data element graphs are converted into a coordinate list (COO) matrix format.

At step 312 of the method 300, the system 100 is configured to predict the set of links using the link prediction module 118 for the data element graphs using the trained graph neural network model based on the COO matrix format. The set of links comprises: positive edges if memory mapping between the plurality data elements are intact, and negative edges if memory mapping between the plurality of data elements are not possible. And finally, at step 314 and 316, the system 100 is configured to predict the memory mapping using the memory mapping prediction module 320. At step 314, the memory mapping prediction module 230 predicts the memory mapping between child variables when two parent variables interact based on the parental graph and operation graph using the set of links. And at step 316, the memory mapping prediction module 320 predicts the memory mapping between parent variables when two child variables interact based on the parental graph and operation graph using the set of links.

According to an embodiment of the disclosure, the concept of variable memory mapping can also be explained with the help of following example. The TABLE 1 below shows example of a Mainframe program code.

TABLE 1

Example of memory mapping

| 01 FILE-CUSTOMER-DETAILS PIC X(69) | | | |
|---|---|---|---|
| 01 CUSTOMER-DETAILS | | 01 WS-CUSTOMER-DETAILS | |
| 05 CUSTOMER-NAME | | 05 WS-CUSTOMER-NAME | |
| 10 FIRST-NAME | PIC X(15) | 10 WS-FIRST-NAME | PIC X(15) |
| 10 LAST-NAME | PIC X(15) | 10 WS-LAST-NAMEPIC X(15) | |
| 05 CUSTOMER-ADDRESS | | 05 WS-CUSTOMER-ADDRESS | |
| 10 ADDRESS-LINE-1 PIC X(15) | | 10 WS-ADDRESS-LINE-1 PIC X(15) | |
| 10 ADDRESS-LINE-2 PIC X(15) | | 10 WS-ADDRESS-LINE-2 PIC X(15) | |
| 10 STATE-CODE PIC X(3) | | 10 WS-STATE-CODE PIC X(3) | |
| 10 PIN-CODE PIC 9(6) | | 10 WS-PIN-CODE PIC 9(6) | |

MOVE FILE-CUSTOMER-DETAILS TO CUSTOMER-DETAILS
All the content in the FILE-CUSTOMER-DETAILS variable is moved to the CUSTOMER-DETAILS variable and the
corresponding child variable also gets its appropriate value.
MOVE CUSTOMER-DETAILS TO WS-CUSTOMER-DETAILS
This means that all the child variable values are also associated as is from the source variable to the target variable.
Similarly, if there is a child variable to child variable movement, the parent variable is also impacted.

MOVE CUSTOMER-DETAILS TO WS-CUSTOMER—DETAILS is the only existing relation/info in source code. But hidden/implicit relations are existing regarding their child variables. For example, First-name—ws-first-name
Last-name—ws-last-name . . . etc.

The graph neural network model of the present disclosure brings out these hidden relations using the memory mapping. The existing methods rely on brute force algorithms and are data and computation intensive, which consumes more time. But now the graph neural network model learns of the hidden relations without mentioning explicitly.

There are following types of memory mapping when different types of variables interact with each other:

Parent to child interaction: Embeddings of variable "FIRST-NAME" is created in a way that it has the information that (has the message) it is a child of "CUSTOMER-NAME" and CUSTOMER-NAME should have the info that it is a parent of FIRST-NAME and LAST-NAME and also that it is a child of CUSTOMER-DETAILS. Hence message gets passed from child to parent.

Parent to parent interaction: When customer-details is moved to ws-customer-details, all the child variables also get moved to ws-customer-details' child variables. Meaning first-name and ws-first-name will share a similar embedding vector. Hence when messages get passed from parent to parent, the children messages are also passed accordingly.

Figure 4:
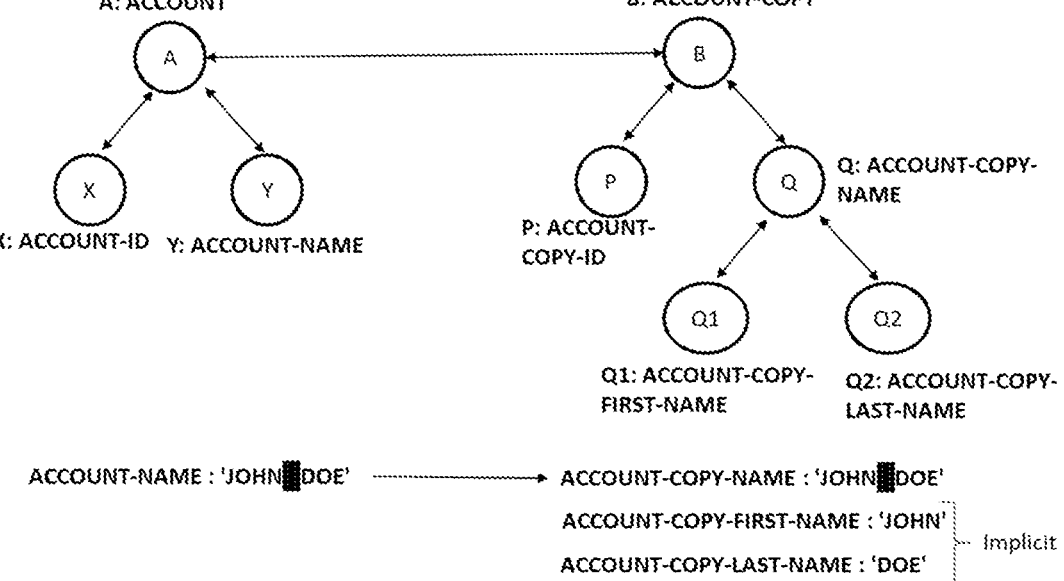
FIG. 4 is an example scenario showing group expansion in a legacy system with the same structure according to some embodiments of the present disclosure.

An example of group expansion in legacy systems with same structure is shown in FIG. 4. The figure shows mapping between ACCOUNT and ACCOUNT-COPY. A moving to B is the only explicit relation explained in the example code. But due to the graph mechanism, the indirect relations between X, Y and P, Q are also conveyed due to the closer embeddings. Since Q has 2 children Q1 Q2, the information of Q gets split according to the size—which means Y is not only closer to Q, but also to Q1 and Q2. Any change in Y will affect Q, Q1 and Q2.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The disclosure herein addresses unresolved problem related to parent-child impact analysis in the Mainframe program application. The process is computationally expensive and becomes further complex when the structure goes deeper. The embodiment thus provides the method and system for machine learning based understanding of a plurality of data elements in a mainframe program code It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for machine learning based understanding of a plurality of data elements in a mainframe program code, the method comprising:

receiving, via one or more hardware processors, a set of application programs as input training data for training a graph neural network model, wherein the set of application programs comprises a structure of the plurality of data elements and a plurality of relations between the plurality of data elements;

parsing, via the one or more hardware processors, the set of application programs using a parser to get a structured data;

capturing, via the one or more hardware processors, relations based on statements in the input training data by creating a graph, wherein the graph represents a parental graph and an operation graph, wherein the graph comprises parental edges and operation edges;

learning, via the one or more hardware processors, latent embeddings of each of the plurality of data elements using a message passing technique through the parental graph and the operation graph, wherein the latent embeddings are represented using a single latent vector;

pretraining, via the one or more hardware processors, the graph neural network model by reconstructing the relation graphs from the single latent vector, wherein the graph neural network model comprises a unique encoder;

training, via the one or more hardware processors, the graph neural network model for predicting a set of links of the plurality of data elements graphs based on a set of training losses, wherein the set of training losses are obtained from a known database;

receiving, via the one or more hardware processors, the mainframe program code as an input for understanding structure of the plurality of data elements, wherein the plurality of data elements comprises one or more child variables and parent variables;

obtaining, via the one or more hardware processors, data element graphs representing structure of the plurality of data elements corresponding to the mainframe program code using a parser;

converting, via the one or more hardware processors, the data element graphs into a coordinate list (COO) matrix format;

predicting, via the one or more hardware processors, the set of links for the data element graphs using the trained graph neural network model based on the COO matrix format, wherein the set of links comprises:

positive edges if memory mappings between the plurality data elements are intact, and negative edges if memory mappings between the plurality of data elements are not possible;

predicting, via the one or more hardware processors, the memory mapping between child variables when two parent variables interact based on the parental graph and operation graph using the set of links; and predicting, via the one or more hardware processors, the memory mapping between parent variables when two child variables interact based on the parental graph and operation graph using the set of links.

2. The processor implemented method of claim 1, wherein size, and properties of data element structures are captured to create node of data element graphs.

3. The processor implemented method of claim 1, wherein the parental graph provides a mapping of parent-child relation of data element structure and the operation graph provides the kind of relation between the parent and child data element structure.

4. The processor implemented method of claim 1 further comprising:

passing the operation edges based on operation based edges between nodes; and passing the parental edges based on parental edges between nodes.

5. The processor implemented method of claim 1, further comprising utilizing the predicted data element graphs for a plurality of applications comprising code translation, and data element classification.

6. A system for machine learning based understanding of a plurality of data elements in a mainframe program code, the system comprises:

a user interface for receiving a set of application programs as input training data for training a graph neural network model, wherein the set of application programs comprises a structure of the plurality of data elements and a plurality of relations between the plurality of data elements;

one or more hardware processors;

a memory in communication with the one or more hardware processors, wherein the one or more first hardware processors are configured to execute programmed instructions stored in the one or more first memories, to:

parse the set of application programs using a parser to get a structured data;

capture relations based on statements in the input training data by creating a graph, wherein the graph represents a parental graph and an operation graph, wherein the graph comprises parental edges and operation edges;

learn latent embeddings of each of the plurality of data elements using a message passing technique through the parental graph and the operation graph, wherein the latent embeddings are represented using a single latent vector;

pretrain the graph neural network model by reconstructing the relation graphs from the single latent vector, wherein the graph neural network model comprises a unique encoder;

train the graph neural network model for predicting a set of links of the plurality of data element graphs based on a set of training losses, wherein the set of training losses are obtained from a known database;

receive the mainframe program code as an input for understanding structure of the plurality of data elements, wherein the plurality of data elements comprises one or more child variables and parent variables;

obtain data element graphs representing structure of the plurality of data elements corresponding to the mainframe program code using a parser;

convert the data element graphs into a coordinate list (COO) matrix format;

predict the set of links for the data element graphs using the trained graph neural network model based on the COO matrix format, wherein the set of new links comprises:

positive edges if memory mappings between the plurality data elements are intact, and negative edges if memory mappings between the plurality of data elements are not possible;

predict the memory mapping between child variables when two parent variables interact based on the parental graph and operation graph using the set of links; and predict the memory mapping between parent variables when two child variables interact based on the parental graph and operation graph using the set of links.

7. The system of claim 6, wherein size, and properties of data element structures are captured to create node of data element graphs.

8. The system of claim 6, wherein the parental graph provides a mapping of parent-child relation of data element structure and the operation graph provides the kind of relation between the parent and child data element structure.

9. The system of claim 6 further configured to:

pass the operation edges based on operation based edges between nodes; and pass the parental edges based on parental edges between nodes.

10. The system as claimed in claim 6, further configured to utilize the predicted data element graphs for a plurality of applications comprising code translation, and data element classification.

11. One or more non-transitory machine-readable information storage mediums comprising one or more instructions which when executed by one or more hardware processors cause:

receiving, a set of application programs as input training data for training a graph neural network model, wherein the set of application programs comprises a structure of the plurality of data elements and a plurality of relations between the plurality of data elements;

parsing the set of application programs using a parser to get a structured data;

capturing relations based on statements in the input training data by creating a graph, wherein the graph represents a parental graph and an operation graph, wherein the graph comprises parental edges and operation edges;

learning latent embeddings of each of the plurality of data elements using a message passing technique through the parental graph and the operation graph, wherein the latent embeddings are represented using a single latent vector;

pretraining the graph neural network model by reconstructing the relation graphs from the single latent vector, wherein the graph neural network model comprises a unique encoder;

training the graph neural network model for predicting a set of links of the plurality of data elements graphs based on a set of training losses, wherein the set of training losses are obtained from a known database;

receiving the mainframe program code as an input for understanding structure of the plurality of data elements, wherein the plurality of data elements comprises one or more child variables and parent variables;

obtaining data element graphs representing structure of the plurality of data elements corresponding to the mainframe program code using a parser;

converting the data element graphs into a coordinate list (COO) matrix format;

predicting the set of links for the data element graphs using the trained graph neural network model based on the COO matrix format, wherein the set of links comprises:

positive edges if memory mappings between the plurality data elements are intact, and negative edges if memory mappings between the plurality of data elements are not possible;

predicting the memory mapping between child variables when two parent variables interact based on the parental graph and operation graph using the set of links; and predicting the memory mapping between parent variables when two child variables interact based on the parental graph and operation graph using the set of links.

* * * * *